United States Patent [19]

Roch

[11] 3,851,249

[45] Nov. 26, 1974

[54] MICROCIRCUIT TEST DEVICE WITH MULTI-AXES PROBE CONTROL AND PROBE STOP MEANS

[75] Inventor: Jacques Leon Roch, San Jose, Calif.

[73] Assignee: Electroglass, Inc., Menlo Park, Calif.

[22] Filed: June 4, 1973

[21] Appl. No.: 366,421

[52] U.S. Cl............ 324/158 P, 324/72.5, 324/158 F
[51] Int. Cl......................... G01r 1/06, G01r 31/02
[58] Field of Search............ 324/158 P, 158 F, 72.5, 324/149

[56] References Cited
UNITED STATES PATENTS
3,648,169   3/1972   Wiesler........................... 324/158 F OTHER PUBLICATIONS
"Future Probers;" EDN, Nov. 11, 1968, 2 pgs.

Primary Examiner—Alfred E. Smith
Assistant Examiner—Ernest F. Karlsen
Attorney, Agent, or Firm—Ellsworth R. Roston

[57] ABSTRACT

A tool for testing the miniaturized circuitry of silicone wafer devices. A ring-shaped structure is supported on a casting or platform for movement along X and Z axes in a horizontal plane. A probe is suspended from the ring-shaped element for contact with a lead-in point of the circuitry on the device to be tested. The probe may be moved along the X and Z horizontal axes and a Y vertical axis relative to the ring, movement in the X and Z axes being controlled by a single lever which acts between the ring and the probe. Movement of the probe in the Y axis is controlled by a screw-type pressure-exerting device which also serves as a pivot point for movement of the probe along the horizontal axes. A high performance board is supported on the ring to act as a junction board so that the probes may be connected to a cable which runs around the ring. The cable extends radially therefrom at a location such that it may be connected to suitable external control circuitry.

13 Claims, 5 Drawing Figures

MICROCIRCUIT TEST DEVICE WITH MULTI-AXES PROBE CONTROL AND PROBE STOP MEANS

BACKGROUND OF THE INVENTION

In the current art of electronic control circuitry, wafers are formed of thin semiconductor slices upon which matrices of microcircuits can be fabricated, or which can be diced into individual circuit units for fabricating transistors and diodes. Since each unit contains its own microcircuit which will be placed into a combination of circuits to accomplish a desired result, it is preferred that each microcircuit be carefully tested before dicing of the semiconductor wafer in order to prevent malformed or malfunctioning circuitry from being employed.

In many cases, the microcircuits each have a plurality of input-output leads or contact points which will be utilized in the finished product. These points can also be used to test the circuitry if one probe can be accurately located on each preselected contact point. Obviously, it is quite a bit easier to test each circuit before the wafer is diced since each circuit will be properly oriented relative to the matrix pattern on the wafer. Accordingly, it has become known to put the wafer on a movable platform or worktable which may be moved relative to a plurality of identical microcircuits, the probes need be oriented relative to only one circuit and fixed in position. Then, the wafer can be moved from position to position so that each microcircuit is properly located relative to the probes for testing.

Unfortunately, the prior art devices have been rather difficult to assemble and have been unsatisfactory in use. Some prior art probes have been manufactured as a relatively flat, vertically oriented blade, a point of which can be placed in contact with an input/output connection of the microcircuit. These blades are quite stiff and must be positioned relative to the wafer with extreme accuracy. Otherwise, either the wafer or the blade will be damaged, since there is little or no flexibility in the vertically oriented blade.

Other probes have been prepared from wires which do have flexibility but which produce excessive contact resistance, can be easily bent out of a usable position, etc.

In any case, the plurality of probes have been mounted upon a ring which is removably positioned within a bore formed in a casting or platform. Each probe is electrically connected to a high performance board which functions to connect the electrical probe leads to external circuitry, such as a computer-driven power device. These rings have to be completely removed from the casting in which they are seated in order to perform any operation upon the wiring connecting the probe to the high performance board mounted in the ring.

In other words, the construction of the prior art devices has been such that it is extremely difficult to assemble, maintain, and/or repair the probes and the wiring system connecting the probes to the high performance board mounted in the ring. Also, the probes have been highly susceptible to being damaged or damaging the circuitry by being positioned improperly.

Accordingly, it is an object of the present invention to provide an apparatus for testing the circuitry of silicone wafer devices in a manner which precludes damage to the wafers or the probes and which allows the probes to be quickly and easily serviced during construction of the ring or during maintenance. Ideally, the apparatus should be constructed in such a manner that the worktable upon which the silicone wafer is mounted can be controlled in its movement by a computer which will move the table in steps so that the individual circuits are serially presented by rows and columns to a plurality of probes mounted on the ring for testing.

SUMMARY OF THE INVENTION

This invention relates to an improved test probe and an apparatus for positioning a plurality of such probes in predetermined positions. With such apparatus, a plurality of microcircuits formed on a single wafer may be tested serially by moving the wafer relative to the probes so that the microcircuits are positioned serially in one location.

In accordance with the present invention, each probe may be comprised of a dielectric or nonconductive material upon which a vertical blade, ending in a point, may be mounted. The blade may be oriented vertically so that the microcircuits may be positioned below the probes. To mount it vertically, it may be fastened to the dielectric by means of a pair of horizontal spring members which, like the blade, are produced from an electrically conductive material. The spring members, in turn, may be suitably connected to electrical lead-in connectors in order to transmit a suitable current through the spring members and the blade when testing the microcircuits. Since the spring members are mounted in horizontal planes, when the wafer is located below the probes and is brought up thereagainst, if the probes are not absolutely accurately positioned, i.e., they extend below the plane into which the wafer is elevated for testing, there will be no damage to the wafer itself or to the probe. The horizontal spring members will allow a slight degree of movement of the blade along the vertical axis, thereby preventing upward movement of the wafer from generating an excessive force between the microcircuit and the blade which could damage either or both of them.

If desired, certain probes may be provided with a suitable spring contact member. When the edge of the wafer is reached, a signal may be generated by this member which is transmitted to the controlling computer, thereby controlling the position of the fixture upon which the wafer is mounted. When this occurs, the fixture may be automatically actuated to align another column or row of microcircuits for serial movement across the testing location.

Each probe, whether a circuit tester or an edge sensor, may be fixed to a suitable probe arm which, in turn, may be movably mounted upon a ring-like member. The probe arm may be spring-biased into contact with the ring-like member (which shall hereinafter be simply referred to as a ring) in such a manner as to be movable relative thereto. The probe may be adjusted along a vertical axis by means of a screw member which is threadably mounted in the ring. The screw may cooperate with an elongated slot in the probe arm to force the arm downwardly against the force of a spring when the blade is to be lowered to a predetermined height. When the screw is backed off, of course, the spring-bias force will cause the probe to move upwardly with the screw.

The center of the vertical arc through which the probe may thus be moved may be located near the rear end of the probe arm which is held in contact with the undersurface of the ring at a pair of pressure points or nibs which create minimal friction in their contact with the ring.

On the other hand, the probe arm may be moved in either the X or Z axis of the horizontal plane by means of a universal pivot rod which is freely movable within a closely fitting predrilled bore in the ring and extends into a blind bore in the rear end of the probe arm. With this structure, the probe arm may be moved in the horizontal plane without any interference from the vertical adjustment screw which extends the slot in the arm. In this manner, the probe arm can be adjusted along any of three axes and will be fixedly retained in the adjusted position by means of the spring-biasing force which holds the arm against the ring.

Thus, by these means, the applicant has devised a new and improved apparatus for testing silicone wafers. Each wafer can be placed upon a fixture or movable base member which may be moved in steps relative to a plurality of probes. Each probe may be programmed to contact a single point on one of the many mircrocircuits on the wafer so as to conduct a test of the microcircuit by passing a current or series of currents therethrough. Movement of the base or fixture in the predetermined steps can be automatically accomplished by means of a computer-driven system. Also, the edge of the wafer may be sensed by means of a special probe so that movement of the wafer in another direction can be accomplished. Each of the probes may be positioned relative to the mounting ring in the X, Y, and Z axes by rather simple controls which allow easy access to the wiring system by means of which the probes are powered to test each circuit.

Of course it will be realized that the invention is not to be deemed to be limited to the specific construction shown and described in this application. Rather, the invention, which is defined solely by the appended claims, should be considered to be merely illustrated by the device shown and described. Other embodiments and modifications of this invention will become apparent to those skilled in the art upon reading the following Detailed Description. Such embodiments and modifications are, of course, fully within the scope of the invention as defined by the claims.

DETAILED DESCRIPTION

Figure 1:
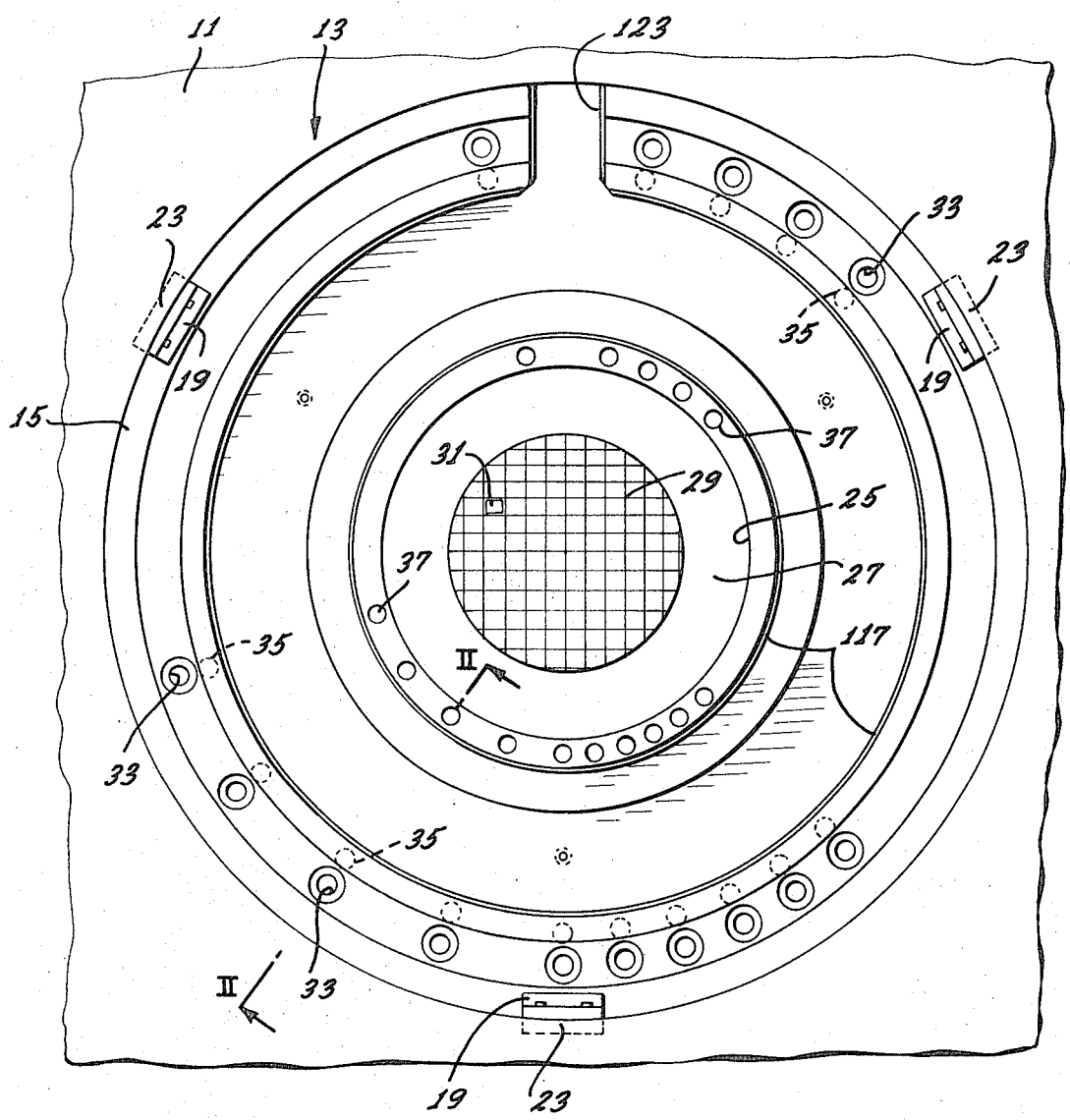
FIG. 1 comprises a top plan view of the ring member upon which probes may be mounted, and also illustrates the location of a silicone wafer to be tested, relative to the ring.

As seen in FIG. 1, a platform or casting 11, which may be formed as an integral part of or otherwise mounted on a machine in a fixed location, may be provided for supporting a ring-like member, generally illustrated at 13. If desired, the ring may be mounted in the manner shown in FIG. 2 by the provision of a flange or lip 15 seated on a shoulder 17 of the casting. A spacer 19 may then be fastened to the ring by any suitable means such as roll pins 21. A clamp 23 may be fastened to the casting 11 in any desired manner so as to extend over and enter into abutment with the upper surfaces of the spacers to prohibit movement of the ring relative to the casting.

As shown in FIG. 1, the ring 13 may be provided with a central bore 25. Situated beneath the ring and generally below the bore, although not necessarily coaxially therewith, is illustrated a worktable or platform 27 upon which is mounted a silicone wafer 29. As illustrated, the silicone wafer is formed with a grid pattern on its upper surface; the space within each grid, one of which is illustrated at 31, may be provided with a microcircuit of any desired type, formed by any suitable means.

The worktable 27 may be moved parallel to the vertically aligned columns of the wafer 29 and parallel to the horizontally aligned rows of the wafer, both as illustrated in FIG. 1, by any suitable means which are not shown. In this manner, each of the microcircuits as illustrated at 31 may be located in a suitable position relative to the axis of the ring 13 so that it may be brought into contact with a plurality of probes suspended from the ring. The worktable may also be moved vertically in order to bring the wafer in and out of horizontal alignment with the probes as each microcircuit is brought into position. The relationship of one probe with a microcircuit on the silicone wafer 29 is illustrated in FIG. 2.

Referring again to FIG. 1, it can be seen that a plurality of countersunk bores 33 may each be radially aligned with a blind bore 35 formed in the bottom or undersurface of the ring and a threaded bore 37 may be similarly radially aligned, adjacent the inner diameter of the ring at the bore 25.

These radially aligned bores are illustrated in various groupings, each having a distinctive angular separation between adjacent bores. In the normal case, only one angular spacing between adjacent bores would be utilized about the entire ring; the illustration merely serves to depict the fact that various angular separations may be employed, depending upon the number of probes to be employed in any given testing apparatus.

Figure 2:
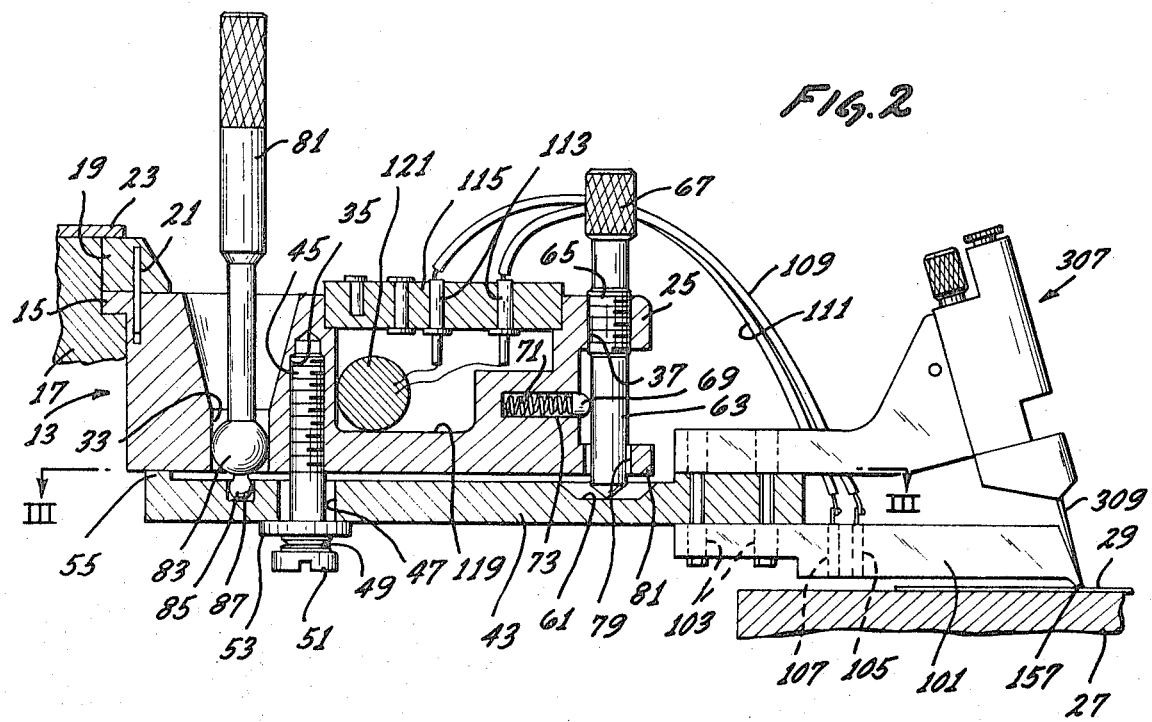
FIG. 2 comprises an illustration of a vertical section of the ring and a probe arm mounted thereon, as would be seen along a line II—II of FIG. 1, realizing that probe arms have not been illustrated in FIG. 1.

Referring now to FIG. 2, there is shown a probe arm 43 which may be suspended beneath the bottom surface of the ring 13. The probe may be held against the ring by means of a screw member 45 which is threaded into the blind bore 35. The screw 45 thus passes through an enlarged bore 47 in the probe arm 43 and a pair of crescent or other type spring washers 49 may be employed to act between the head end 51 of the screw and a washer 53. Thus, the arm 43 is biased upwardly toward the ring while the screw 45 limits but does not prohibit vertical and horizontal movement of the arm relative to the ring.

At the outer end of the arm 43, one or more nibs 55 (shown as two) may be employed to bear against the undersurface of the ring 33 to provide a stable, non-rocking arm against the ring and reduce the frictional contact therebetween. An elongated slot 61 may be formed in the upper surface of the arm 43 in order to receive the conical tip of a vertical control member 63.

The vertical control member 63 may be provided with a threaded portion 65 which cooperates with the threaded bore 37. Thus, manually turning the knurled knob 67 of the vertical control member will cause it to move axially relative to the bore 37. As the conical tip is moved into the slot 61 in the arm, the arm will be forced downwardly against the force of the spring washers 49 in an arc, the center of which is located along a line extending through the rear edges of the nibs 55. On the other hand, as the vertical control member is withdrawn, the spring washers will force the arm upwardly to a maximum limit in which the inner end of the arm contacts the lower surface of the ring 13.

The lower portion of the vertical control member 63, below its threaded section 65, may have a smooth circumference so as to cooperate with a biasing member 69 which may, for example, be formed of a small nylon plug acted upon by a coil spring 71, both elements being situated within a blind horizontal bore 73 in the ring. The plug and spring may be employed to force the vertical control member 63 to maintain a constant axial position free from play. If desired, the lower end of the vertical control member may be supported and its radial movement limited by passing it through a smooth bore 79 formed in a flange 81 extending from the lower surface of the ring. In other words, the smooth bore 79 and the threaded bore 37 may be coaxially aligned. Also, if desired, the bores 37 and 79 may be provided with slots or similar reliefs (not shown) which extend through the entirety of each bore parallel to the axis thereof such that the biasing plug 69 forces the vertical control member 63 toward both slots. Thus stability is insured.

With structure in the nature of that thus described and illustrated, it will be quickly seen by those skilled in the art that vertical movement of the arm 43 may be quickly and accurately controlled by cooperation of the bolt or screw 63 and the slot 61.

In order to control movement of the arm in a horizontal plane, a horizontal control rod 81 may extend into and through the countersunk bore 33 in the manner illustrated in FIG. 2. Adjacent the lower end of the horizontal control member, a ball or bearing 83 may be formed integral with or mounted on the rod 81 to cooperate very closely with the wall of the bore 33. In other words, the bearing will be constantly in contact with and bear against the surface of the bore 33 so that as the control member 81 is oscillated or pivoted universally about the center of the ball 83, there will be very little play between the control member and the bore. Extending from the pivot ball 83, there may be provided an actuating or drive bearing or ball 85 which cooperates with a blind bore 87 located in the upper surface of the arm 43. Again, the drive bearing 85 may be produced so as to be closely fitting with the surface of the bore 87 to prohibit excessive play therebetween. With this structure, when the control member 81 is oscillated or pivoted about the center of the bearing 83, under the limits imposed by the wall of the countersink, the drive bearing 85 will cause the arm 43 to move universally in the horizontal plane.

In use, if it is desired to pivot the arm so that its inner end moves along a Z axis, i.e., perpendicular to the radius of the ring, the control member 81 may be pivoted in a plane which is substantially tangential to the radius of the ring 13. In other words, as the upper end of the rod 81 is pulled toward the viewer of FIG. 2, the drive bearing 85 will drive the outer end of the arm 43 away from the viewer, limited only by contact of the fastening bolt 45 with the periphery of the bore 47. Since the vertical control bolt 63 is in contact with the sides of the slot 61, the vertical control member will act as the pivot point for movement of the inner end of the arm in the Z axis toward the viewer.

Figure 3:
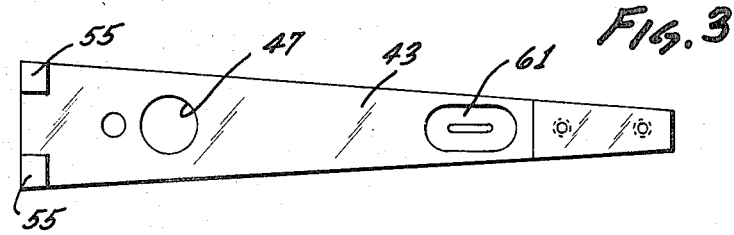
FIG. 3 comprises a top plan view of a probe arm, as seen along a line III—III of FIG. 2.

On the other hand, when it is desired to move the arm along the X axis, i.e., directly along a radius of the ring 13, the control member 81 may be moved in an arc in the plane of the paper as seen in FIG. 2, thus driving the arm in or out along the radius, again limited only by contact between the fastening bolt 45 and the bore 47. Since the slot 61 is elongated as shown in FIG. 3 along the X axis of the arm, motion along this axis will not be inhibited by contact of the slot with the vertical control member 63.

It will now be apparent to those skilled in the art that movement of the control arm 43 in the X, Y, and/or Z axis may be quickly and easily controlled by movement of either the rod 63 or the rod 81. Also, so long as the position set for either of those rods is not altered, the arm will remain in a fixed position under the biasing force exerted by the springs 49.

As shown in FIG. 2, a probe 101 may be fixed to the inner end of the probe arm 43 by any suitable fastening means such as a pair of bolts or screws 103. As will be more completely described hereafter a pair of connector pins 105 and 107 may extend from the probe so that a pair of wires 109 and 111, respectively, may be attached thereto. In turn, the wires may be attached to a pair of connectors 113 mounted in a high performance board 115. This exemplary high performance board may be seated on a pair of shoulders 117 (FIG. 1) in the ring which are formed adjacent the edges of a circumferential groove 119. A cable 121 may be seated in the groove and the connectors 113 suitably attached thereto as illustrated in FIG. 2. The cable 121 may travel along the entire length of the groove 119 so that every probe mounted on the ring 13 may be suitably connected to the cable. The cable may be lead off from the groove 119 via a radial groove 123 (FIG. 1) so that it may then be connected to the control drive circuitry.

Figure 4:
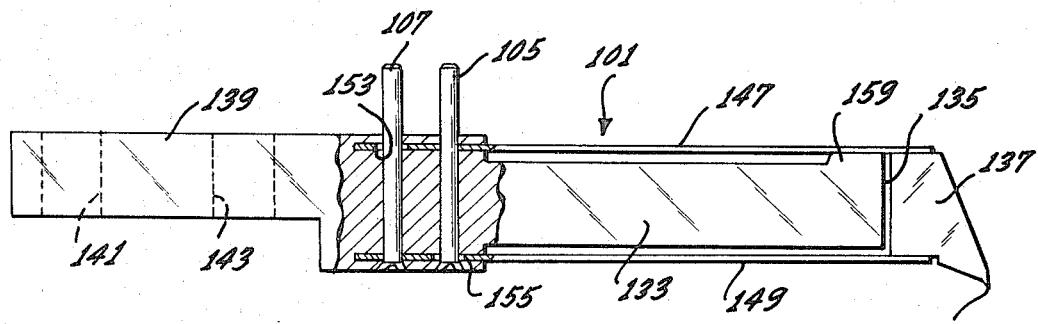
FIG. 4 comprises a side elevation, partly in section, of a preferred embodiment of a probe which may be utilized with the present invention.

Referring now to FIG. 4, one embodiment of a probe 101 which may be used with the present invention has been illustrated. In this embodiment, the probe has a central elongated dielectric body 133. Although not illustrated in plan view, the body 133 may become narrower as the distance from the left side of FIG. 4 increases, until forming substantially a sharp edge 135 adjacent a probe blade 137. At the opposite end of the body 133, a flange 139 may be provided having suitable apertures 141 through which the bolts 103 may be passed in order to fix the probe to the arm 43.

The probe blade 137 may be brazed, soldered, or otherwise suitably connected to a pair of flat, relatively flexible conductive elements or beams 147 and 149. In a manner similar to the plan configuration of the body 133, these elements also are substantially triangular in configuration and are substantially pointed at the end at which they are each fastened to the probe blade.

The rear ends of the beams 147 and 149 may be embedded in or otherwise to the central body 133 in such a way that the element 147 may be placed into conductive contact with the pin connector 105, while separated from such contact with the pin connected 107 by means of an aperture 153 formed large enough to allow the pin 107 to freely pass therethrough without making contact. Similarly, the pin 107 may be in contact with the element 149, while the pin 105 is prevented from contacting that element by means of an aperture 155. Thus, a circuit may be formed by means of the pin 105, beam 147, probe blade 137, beam 149, and pin connector 107.

This rather simple structure allows the achievement of a result which was completely unobtainable with the prior art devices. This result will now be clearly apparent from the drawing of FIG. 4 to those skilled in the art; the horizontal arrangement of the flexible conductive beams 147 and 149 will form a Kelvin arrangement with the probe blade 137 and will allow a tip or point 157 of the probe blade 137 to be pushed upwardly slightly after a predetermined preload in beam 149 and its structure is exceeded. The upward movement will be limited only by contact of the lower conductive element 149 with the undersurface of the body 133. At the same time, downward movement of the probe blade may be limited by contact of the upper conductive element 147 with a plateau-like flange 159 on the body 133. Thus, as a result of this flexibility of the position of the prove blade and point, it is possible for a person using the apparatus to position each probe along the Y axis within a visual tolerance limit without fear of damaging the probe or the microcircuitry intended to be tested.

Figure 5:
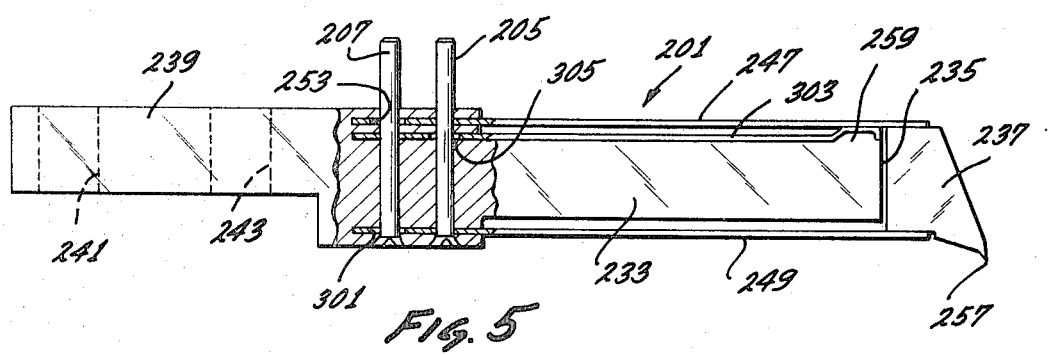
FIG. 5 comprises a similar illustration of a preferred embodiment of an edge-sensing probe which may be utilized to detect the edge of the silicone wafer.

In FIG. 5, a second type of probe has been illustrated which may be utilized to operate a predetermined movement of the worktable 27 to align a new column or row of microcircuits with the probes being used whenever the last circuit in a column or a row has been tested. The illustrated probe is in many respects identical to that illustrated in FIG. 4. Accordingly, those elements which are identical in configuration and function have been provided with similar reference numerals, each preceded by the number "2" rather than the number "1." Thus, for example, this probe is designated "201", having a body 233, and a blade 237, whereas the previous probe was designated "101" having a body 133, and a blade 137, etc. Accordingly, that structure which has previously been described with reference to the probe in FIG. 4 need not be described again here.

The probe 201 is distinguishable from the probe 101 in that both the conductive elements 247 and 249 are formed so as to be in contact with the pin connector 205. On the other hand, both probes are insulated from contact with the pin connector 207 by means of an aperture 253 in the element 247 and an aperture 301 in the element 249. A third conductive beam, or contact of any suitable type, 303 may be mounted and fixed to the upper surface of the body 233 and provided with an aperture 305 so as to be insulated from contact with the pin 205. On the other hand, the contact 303 may be in fixed electrical contact with the pin connector 207.

In the position illustrated in FIG. 5, it can be seen that a circuit may be formed through the pin 205, the flexible beam 247, the contact 303, and the pin or connector 207. If the probe 201 is adjusted in the Y axis so that it assumes this position whenever it is not in contact with a silicone wafer, this circuit completion may be used to instruct the worktable 27 to realign itself relative to the probes.

On the other hand, such proper positioning of the probe may be utilized to cause the point 257 to contact the silicone wafer whenever such a wafer is located beneath the probe. If the probe is positioned slightly below what might otherwise be preferred for the position of probe 101, contact of the point 257 with the silicone wafer will cause the probe blade to be pushed upwardly against the biasing forces generated by the conductive beams 247 and 249. When the beam 247 is thus pushed upwardly, it will be prevented from contacting the outer end of the contact 303 above the flange 259 and the circuit will be broken. Thus, it should now be apparent that when contact exists between the wafer 29 and the blade 237, there will be no circuit signal for reorientation of the worktable. On the other hand, when the silicone wafer does not push the blade 237 upwardly, such a signal will exist.

Consequently, both the probes 101 and 201 may be used and mounted on probe arms 43 in the manner illustrated in FIG. 2 to accomplish the desired results. If desired, an inking device 307 may also be mounted on an arm 43 by means of the bolts 103, so as to position an inking point 309 immediately above the point of the probe. Such an inking device may be used for any number of purposes, such as marking a defective microcircuit, etc.

It is now clear that the above-recited objectives and advantages desired for test apparatus of this nature are clearly available and inherent in this invention, both in the abovedescribed structure and in a wide variety of distinctive structures and embodiments which will employ the invention without exceeding the scope thereof. Accordingly, it will also be realized by those skilled in the art that the above description is merely an illustration of the preferred embodiment of the invention and does not, per se, define the limits thereof.

I claim:

1. Apparatus including electrical control circuitry for testing microcircuitry comprising support means and
    a test probe supported by the support means and comprising
    a body of dielectric material, the body being fixed to the support means,
    a pair of flexible electrically conducting parallel beams fixed to said support means for flexible movement relative to said body and disposed on opposite sides of said body for limited movement relative to said body, and
    an electrically conductive blade member electrically connected to and positioned between said beams and having
    means for contacting the microcircuitry to be tested, and
    a pair of electrically conductive means supported by the support means for individually connecting said beams to the electrical control circuitry.

2. The apparatus of claim 1 wherein said probe further includes an electrically conductive contact means intermediate a particular one of said flexible beams and said body and normally in contact with both and supported by said body for displacement from the particular beam upon the flexing of the particular beam, and wherein the electrically conductive contact means is connected to one of the electrically conductive support means and the particular beam is connected to the other one of the electrically conductive support means to provide a complete circuit to the electrical control circuitry only when said blade is not in contact with a wafer bearing the microcircuit to be tested.

3. The apparatus of claim 1 wherein the support means includes probe arm, a support member, means for fixing said probe to said probe arm, and means for mounting said probe arm on said support member comprising means for biasing said probe arm into abutment with said support member in slidable relationship to the support member, first means operatively coupled to said probe arm and said support member for pivoting said probe arm relative to said support member about an end thereof distal from said blade member, and second means operatively coupled to said probe arm and said support member for sliding said probe arm relative to said support member.

4. The apparatus of claim 3 wherein said support member has at least one planar surface and said second means includes means for longitudinally moving said probe arm relative to said support member along the planar surface of said support member.

5. The apparatus of claim 4 wherein said second means comprises a first bore in said probe arm, a second bore in said support member, and control rod means extending through said second bore in close contact therewith and into said first bore in close contact therewith, said rod including means thereon for universally pivoting said rod in said first and second bores relative to said probe arm and said support member to provide a slidable adjustment in the position of the probe arm along the planar surface of the support member.

6. A probe for testing microcircuitry comprising a dielectric body, at least a first flexible beam mounted on one side of said body for limited movement in a first direction relative to said body until engaged by said body, the first flexible beam being electrically conductive, at least a second flexible beam mounted on the other side of said body for limited movement relative to said body in a second direction opposite to the first direction until engaged by said body, the second flexible beam being electrically conductive, an electrically conductive probe blade electrically connected to said first and second beams and oriented transverse thereto for contacting the microcircuitry in accordance with the flexible characteristics of the beams to test the beams, and means for transmitting current through said beams and said blade to said microcircuitry when said blade contacts said microcircuitry.

7. The probe of claim 6 including electrically conductive means disposed on said body first for contacting said flexible beam when said probe blade does not contact the microcircuitry and for being separated from said first flexible beam when said probe blade contacts the microcircuitry.

8. The probe of claim 6 wherein the current-transmitting means includes a first electrically conductive pin electrically connected to said first blade and electrically isolated from said second blade and a second electrically conductive pin electrically connected to said second blade and electrically isolated from said first blade.

9. The probe of claim 7 wherein the current-transmitting means includes a first electrically conductive pin electrically connected to said first blade and electrically isolated from said second blade and said electrically conductive means and further includes a second electrically conductive pin electrically connected to said second blade and said electrically conductive means and electrically isolated from said first blade.

10. The probe of claim 8 wherein the first and second pins are supported by the dielectric body and extend from the body.

11. The probe of claim 9 wherein the first and second pins are supported by the dielectric body and extend from the body.

12. The apparatus of claim 1 wherein the pair of electrically conductive means comprise a pair of contact pins supported by the body and wherein one of the beams is electrically conductive with one of the pins and the other beam is electrically conductive with the other pin.

13. The apparatus of claim 2 wherein the pair of electrically conductive means comprise a pair of contact pins supported by the body and wherein one of the beams is electrically conductive with one of the pins and wherein the other beam and the electrically conductive contact means are electrically conductive with the other pin.

* * * * *